(12) United States Patent
Tian

(10) Patent No.: US 7,925,792 B2
(45) Date of Patent: Apr. 12, 2011

(54) METHOD AND SYSTEM FOR NEGOTIATING DEVICE INFORMATION, AND DEVICE THEREOF

(75) Inventor: Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 12/101,652

(22) Filed: Apr. 11, 2008

(65) Prior Publication Data

US 2008/0189363 A1    Aug. 7, 2008

Related U.S. Application Data

(63) Continuation of application No. PCT/CN2007/000219, filed on Jan. 19, 2007.

(30) Foreign Application Priority Data

Jan. 21, 2006  (CN) .......................... 2006 1 0003835

(51) Int. Cl.
*G06F 15/16* (2006.01)
(52) U.S. Cl. .................... 709/248; 709/221; 717/173
(58) Field of Classification Search .................. 709/221, 709/248; 717/173
See application file for complete search history.

(56) References Cited

U.S. PATENT DOCUMENTS

| | | | |
|---|---|---|---|
| 6,425,126 B1 | 7/2002 | Branson et al. | |
| 2003/0225797 A1 | 12/2003 | Shields et al. | |
| 2003/0236744 A1 | 12/2003 | Sakamura et al. | |
| 2004/0006551 A1* | 1/2004 | Sahinoja et al. | 707/1 |
| 2004/0024875 A1 | 2/2004 | Horvitz et al. | |
| 2004/0088335 A1 | 5/2004 | Xu et al. | |
| 2004/0153576 A1* | 8/2004 | Hansmann et al. | 709/248 |
| 2005/0060361 A1 | 3/2005 | Chatrath et al. | |
| 2006/0074996 A1* | 4/2006 | Corbett et al. | 707/201 |
| 2006/0106937 A1 | 5/2006 | Shields et al. | |

(Continued)

FOREIGN PATENT DOCUMENTS

| | | |
|---|---|---|
| CN | 1469596 A | 1/2004 |
| EP | 1367800 | 12/2003 |
| EP | 1383293 A2 | 1/2004 |

(Continued)

OTHER PUBLICATIONS

European Search Report regarding Application No. 07702150.9/PCT/CN2007000219 dated Dec. 23, 2008.

(Continued)

*Primary Examiner* — John Follansbee
*Assistant Examiner* — Glenford Madamba
(74) *Attorney, Agent, or Firm* — Harness, Dickey & Pierce, P.L.C.

(57) ABSTRACT

System and method for negotiating device information and device thereof are disclosed by the various embodiments of the present disclosure. The method includes the processes as follows: sending, by a network entity initiating a data synchronization process, a data synchronization initialization request carrying the identifier of the network entity initiating a data synchronization process to a destination network entity of the data synchronization process; accessing, by the destination network entity of the data synchronization process, the network entity for storing device information according to the identifier, acquiring the device information corresponding to the identifier according to the stored corresponding relation and the stored device information, and sending out a response to the network entity initiating the data synchronization process. With the system, method and device thereof provided by the various embodiments of the present disclosure, the data transmission flow is decreased and the time for the data synchronization is saved.

40 Claims, 14 Drawing Sheets

U.S. PATENT DOCUMENTS

| | | | |
|---|---|---|---|
| 2007/0112880 A1* | 5/2007 | Yang et al. | 707/201 |
| 2007/0277169 A1* | 11/2007 | Rao et al. | 717/173 |
| 2008/0215758 A1 | 9/2008 | Gerdes et al. | |
| 2008/0319948 A1* | 12/2008 | Berg et al. | 707/3 |

FOREIGN PATENT DOCUMENTS

| | | |
|---|---|---|
| EP | 1473873 | 11/2004 |
| JP | 2002366521 | 12/2002 |
| WO | WO-2005026958 | 3/2005 |
| WO | WO-2006018030 | 2/2006 |

OTHER PUBLICATIONS

International Search Report for International No. PCT/CN2007/000219, dated Apr. 18, 2007, with English translation.

Open Mobile Alliance. SyncML Device Information. Candidate Version 1.2- Jun. 1, 2004.

Open Mobile Alliance. SyncML Representation Protocol, Data Synchronization Usage. Candidate Version 1.2- Jun. 6, 2004.

Open Mobile Alliance. SyncML Data Sync Protocol. Candidate Version 1.2- Jun. 1, 2004.

First Chinese Office Action regarding Application No. 200780000197.7, mailed Aug. 11, 2010. Partial translation provided by Huawei Technologies Co., Ltd.

First Chinese Office Action regarding Application No. 200610003835.8, mailed Dec. 5, 2008. Partial translation provided by Huawei Technologies Co, Ltd.

* cited by examiner

| Basic device information | |
|---|---|
| Synchronization database capability information | Communication capability information |
| Synchronization type information | Global synchronization feature information |
| Dynamic device capability information | Device capability information |
| Device storage information | |
| Device configuration information | |
| User configuration information | |

Fig.11

METHOD AND SYSTEM FOR NEGOTIATING DEVICE INFORMATION, AND DEVICE THEREOF

CROSS-REFERENCE TO RELATED APPLICATIONS

This application is a continuation of International Application No. PCT/CN2007/000219, filed Jan. 19, 2007. This application claims the benefit of Chinese Application No. 200610003835.8, filed Jan. 21, 2006. The disclosures of the above applications are incorporated herein by reference.

FIELD

The present disclosure relates to technologies for processing device information in data synchronization, and particularly to, a method and system for negotiating device information in data synchronization, and device thereof.

BACKGROUND

The statements in this section merely provide background information related to the present disclosure and may not constitute prior art.

In order to synchronize personal information or corporation data between multiple platforms and networks, the industry has paid more attention to the development of SyncML. The use of SyncML can make a user, a device developer, a component developer, a data provider, an application developer and a service provider cooperate with each other, and enable network data to be accessed by any client anywhere at any moment.

A typical application of the SyncML initiative is the data synchronization between a mobile device and a network service device. Besides the abovementioned application, the SyncML initiative is applicable to the data synchronization between two equivalent devices, such as two computers. FIG. 1 shows a schematic diagram illustrating data synchronization between a client and a server. As shown in FIG. 1, the data synchronization includes the following processes. After a negotiation of device information at an initialization phase of the synchronization, the client sends the data changed by the client to the server for storing, and the server sends the data changed by the server to the client for storing, so as to guarantee the data synchronization between the client and the server.

At present, there are many types of data synchronization between the client and the server, such as two-way synchronization, slow synchronization, one-way synchronization from client, refresh synchronization from client, one-way synchronization from server, refresh synchronization from server and server alerted synchronization.

The processes of two-way data synchronization are hereinafter described as follows. FIG. 1 is a message flow schematic diagram illustrating two-way data synchronization between a client and a server in the prior art. FIG. 1 includes the following steps:

Step 100: a client sends a synchronization initialization package to a server.

Step 101: the server sends the synchronization initialization package to the client.

In steps 100 and 101, a synchronization initialization is performed. The synchronization initialization includes the following: authentication, synchronization data negotiation, device information negotiation etc. The device information negotiation determines what data format can be synchronized, and which synchronization types are supported.

Step 102: the client sends synchronization data to the server.

Step 103: the server sends synchronization data to the client.

In steps 102 and 103, the client sends changed data to the server based on change state of the data. The change state of the data may be Add, Update, Delete, Move etc. The server modifies the data stored in the server according to the data received from the client, so that the server fulfils the data synchronization. The server also sends the changed data to the client based on the change state of data stored in the server, and the client modifies the data stored in the client according to the data received from the server, so that the client fulfils the data synchronization.

Step 104: after receiving the synchronization data, the client sends a synchronization acknowledgement message to the server.

Step 105: after receiving the synchronization data, the server sends synchronization acknowledgement message to the client.

FIG. 2 shows a schematic diagram illustrating a system for implementing data synchronization in the prior art. As shown in FIG. 2, the system includes a client and a server. The client can perform message interaction with the server. On the client side, there is also a client database for storing the data needed by a user of the client. The client database can be set in the client or can be set separately. On the server side, there is also a server database for storing the data of the server. The server database can be set in the server or can be set separately.

In general, the client can be an intelligent terminal, such as a computer, a mobile terminal or a Personal Digital Assistant (PDA). The data stored in the database at the client side may include: contacts, calendars, notes, emails etc. There are standard data formats for all of the above data. The client can convert the stored data into standard data format, and send the converted data to the server. After the received data is processed by the server, the server may store the processed data into the database at the server side. In general, the server can be a computer or a network server performing data synchronization. The server can receive a data synchronization message or a data synchronization command from the client; or the server can send a data synchronization message or a data synchronization command to the client. The steps of data synchronization between the client and the server are simply described above. The client and the server need to negotiate device capability at the initialization state of the data synchronization, and the steps of the negotiation are described as follows.

A client sends a server a data synchronization initialization message (SyncML Initialization Message) carrying the device information of the client. Alternatively the SyncML Initialization Message is used to request device information of the server. The device information of the client is contained in <Result> command of the SyncML Initialization Message, while a request for device information of the server is carried in <Get> command of the SyncML Initialization Message. If the client does not need the device information of the server, the <Get> command will not be sent to request device information of the server. Otherwise, in response to the request of the client, the server carries the device information of the server in a response to the SyncML Initialization Message.

Likewise, the server can also request the device information of the client from the client. The detailed steps are described as follows.

A client sends a SyncML Initialization Message to a server to request device information of the server. The server sends the client a response to the SyncML Initialization Message, and the response carries the device information of the server, and a request for device information of the client. The device information of the server is contained in <Results> command of the response to the SyncML Initialization Message; while a request for the device information of the client is contained in <Get> command of the response to the SyncML Initialization Message. The client sends the SyncML Message containing the device information of the client to the server. The <Results> command of the SyncML Message carries the device information of the client.

The device information of the client and the device information of the server are mainly used for a content adaptation. For example, both the client and the server support communication synchronization, but the device information supported by the clients of different manufacturers is different, for example, the versions of the contacts supported are different, or fields supported are different although the versions supported are the same, negotiation of the device capability between the server and the client should be performed, the client and the server can determine the device capability each other, and the contents adaptation can be performed and the data synchronization can be implemented between the client and the server.

A data structure of the device information is shown in FIG. 3. The device information related to device includes: a device manufacturer, a device model, a software version number, a hardware version number and device type. The device information related to synchronization data includes: a device model, supported types of synchronization data, supported properties of synchronization data, supported values of the properties, supported parameters of synchronization data, etc. The device information relates to data storage includes: a Uniform Resource Identifier (URI) of local data storage, a maximum length of Globally Unique Identifier (GUID), data storage capacity and supported synchronization type. The device information related to extension mechanism includes: a name of a custom extended element, and a value of the custom extended element.

After the device information is described in a markup language, the device information may be stored into the database at server side or be stored into the database at client side, or the device information may be used in an interaction between the client and the server.

SUMMARY

Various embodiments of the present disclosure provide a method and system for device information negotiation, and device thereof, which can decrease data transmission flow, and time for data synchronization.

The device information negotiating system includes a server and a client interacting with each other, and the device information negotiating system further includes: a device information server, configured to store device information, respectively perform an information interaction with the client and the server, and respectively provide the device information to the client and the server.

The method for negotiating device information includes the processes as follows: setting a network entity for storing device information, wherein a corresponding relation between the device information and an identifier used to identify the device information is stored in the network entity for storing device information; sending, by a network entity initiating a data synchronization process, a data synchronization initialization request carrying the identifier of the network entity initiating a data synchronization process to a destination network entity of the data synchronization process; accessing, by the destination network entity of the data synchronization process, the network entity for storing device information according to the identifier, acquiring the device information corresponding to the identifier according to the corresponding relation and the device information stored by the network entity for storing device information; sending out, by the destination network entity of the data synchronization process, a response to the network entity initiating the data synchronization process.

A device for negotiating device information includes a device information acquiring module and a receiving/sending module.

The device information acquiring module is configured to acquire device information from a device information server, and send the acquired device information to the receiving/sending module.

The receiving/sending module is configured to perform information interaction with device in device information negotiating system based on acquired device information.

As can be seen from the above solutions, in embodiments of the present disclosure, the network entity for storing the device information of the client and the device information of the server is set in the network performing the data synchronization. Then the client and the server may acquire, based on the identifier of each other, the device information corresponding to the identifier of each other from the network entity for storing the device information. Therefore, it does not require that the client and the server send the device information to each other, when the client and the server negotiate device information. Thus, the data transmission flow is decreased and time for the data synchronization is saved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11 shows a schematic diagram illustrating a data structure of device information in accordance with the present disclosure.

DETAILED DESCRIPTION

The following description is merely exemplary in nature and is not intended to limit the present disclosure, application, or uses.

The present disclosure is further described hereinafter in detail with reference to accompanying drawings as well as various embodiments so as to make the objective, technical solution and merits thereof more apparent.

There are several disadvantages in the device information negotiation processes in prior art. Firstly, most of the device information is fixed after the client was manufactured or after the device information of the client has been synchronized. However at present, most of the device information should be transferred in each device information negotiation, so the data transmission flow is increased, the time for data synchronization is deferred, and charge of the user using the client is increased. Secondly, the <Get> command in the SyncML Initialization Message cannot exactly acquire a certain specific element or value of attribute of the device information. Finally, dynamic information in the device information lacks a negotiation mechanism. For example, a client supporting a removable storage device cannot negotiate with the server, when a storage device is plugged in the client and a maximum storage capacity of the client has been changed.

Various embodiments of the present disclosure provide a method and system for device information negotiation, and device thereof, which can decrease data transmission flow, and time for data synchronization.

In various embodiments of the present disclosure, a device information server is used for storing device information of a client and device information of a server, and the device information server is set in a network performing data synchronization. When the data synchronization is performed, the client and the server may acquire the device information of each other from the set device information server. So the client and the server are not required to send the device information of themselves to each other. Thus, data transmission flow is decreased, and the time for performing the data synchronization is saved.

Figure 1:
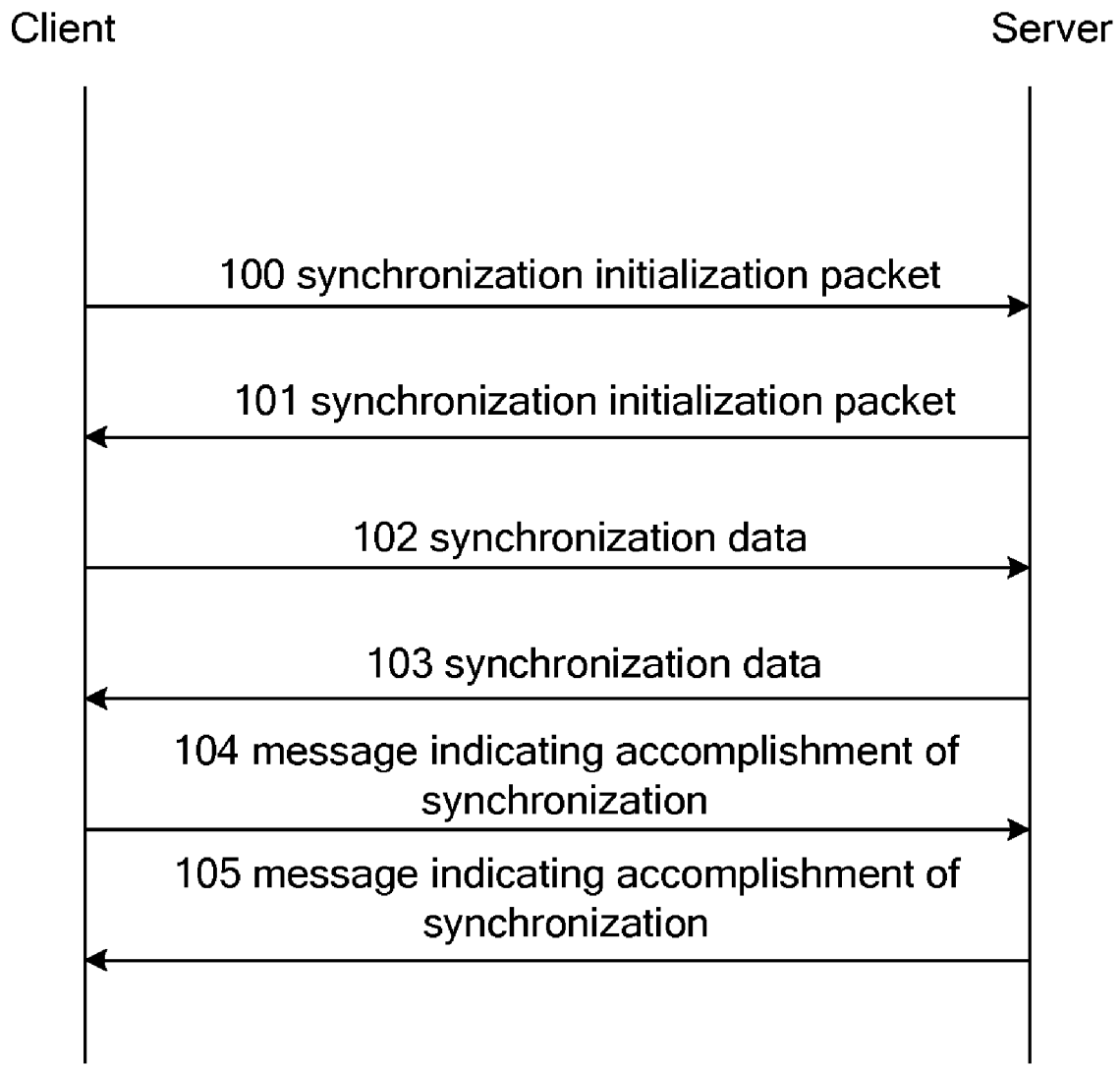
FIG. 1 shows a flow chart of a method for performing data synchronization between a client and a server using a type of two-way synchronization in the prior art.
Figure 2:
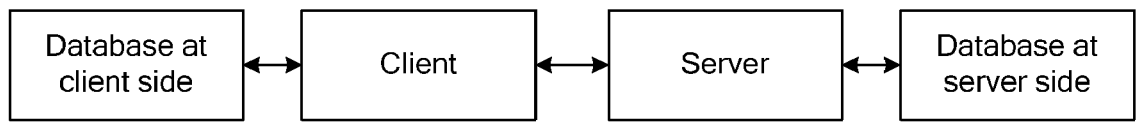
FIG. 2 shows a schematic diagram illustrating a system for performing a data synchronization process in the prior art.
Figure 3:
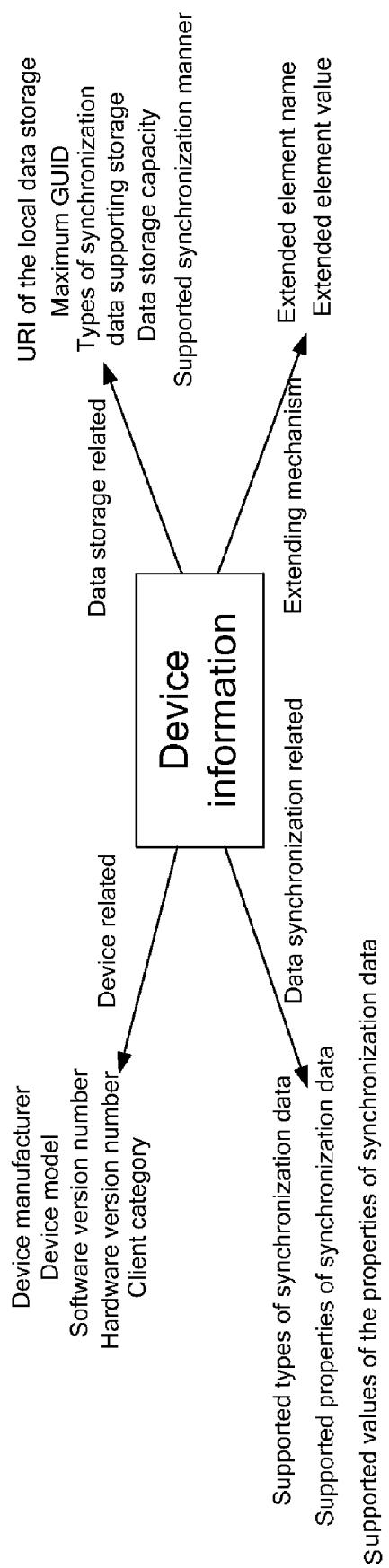
FIG. 3 shows a schematic diagram illustrating a data structure of device information in the prior art.
Figure 4:
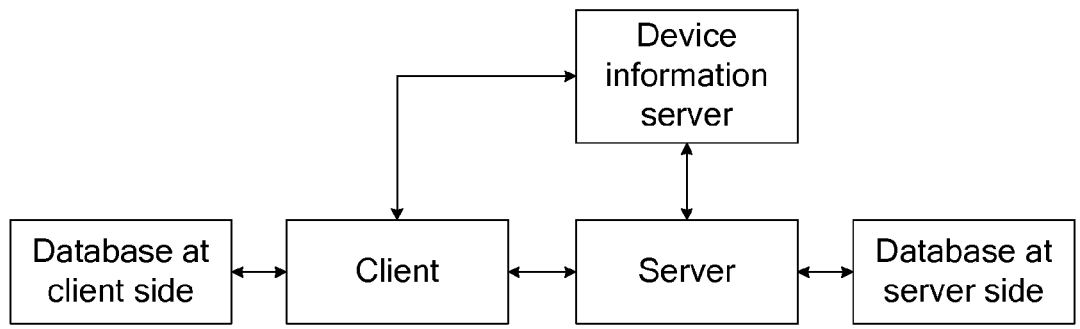
FIG. 4 shows a schematic diagram illustrating a system for negotiating device information in a data synchronization process in accordance with the present disclosure.

FIG. 4 shows a schematic diagram illustrating a system for negotiating device information in data synchronization in accordance with embodiment of present disclosure. As shown in FIG. 4, the system includes a client and a server, a database at the client side, and another database at the server side. The client and the server perform a message interaction, the client acquires client data from the database at the client side, the server acquires server data from the database at the server side, the database at the client side may be integrated into the client or be set separately, and the database at the server side may be integrated into the server or be set separately.

The system also includes a device information server, and the device information server is used for storing device information of the client and device information of the server. The device information server is used for sending the device information of the server and the device information of the client to the server and client respectively, when the server or client sends a device capability acquiring message to the device information server. Alternatively, the device information server is used for sending a device information change notification to the client or server when the device information is changed, after the client or the server subscribes to the device information change notification at the device information server. Alternatively, when the client or server sends a query about changed device information, the device information server is used for sending the device information changed to the client or server. Alternatively, when the client or server sends a request for changing device information to the device information server, the device information server is used for changing the device information stored based on the request from the client or the server.

Both the device information of the client and the device information of the server stored in the device information server are identified by identifier, and the identifier may be a URI, a basic device information, a user account name, or any combinations of the above mentioned. When the client or the server acquires the device information of each other, the client or the server needs to acquire identifier of the device information, and sends a device capability acquiring message carrying the identifier of the device information to the device information server. The device information server determines the device information corresponding to the identifier and sends the device information to the client or the server.

In an embodiment of the present disclosure, there are a first device information server and a second device information server. The first device information server is used for storing the device information of a client, and the second device information server is used for storing the device information of a server. Alternatively, multiple device information servers may be set, and one of the multiple device information servers is used for storing the device information of the server, and the other device information servers are used for respectively storing the device information of different clients. Alternatively, the device information of the server and the device information of the client may be stored in multiple device information servers based on a set rule.

The device information server is used for storing and maintaining device information of the client and device information of the server; receiving a device information subscription change request from the client or the server; processing the device information subscription change request and returning a response; sending the device information changed to the client or the server based on the device information subscription change request of the client or the server; supporting the server or the client to query each other whether the device information is changed.

Figure 5:
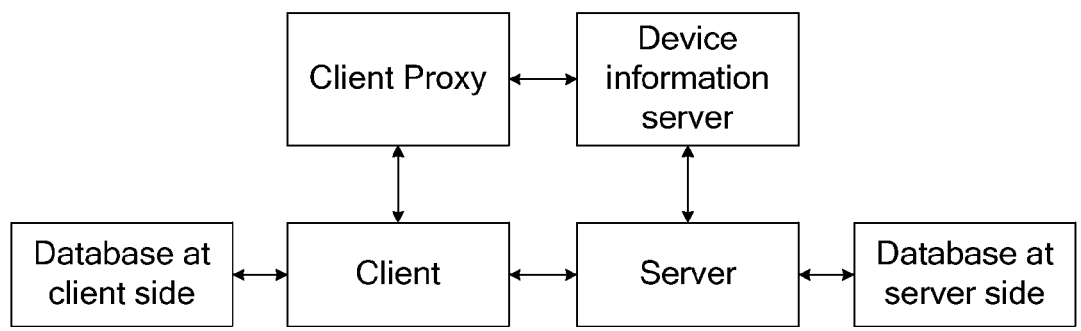
FIG. 5 shows a schematic diagram illustrating an embodiment of system for negotiating device information in a data synchronization process in accordance with the present disclosure.

In some cases, the client can not directly access a device information server. For example, due to bandwidth limitation or security problem, a Client Proxy can be set in network performing data synchronization in the embodiment of the present disclosure. The Client Proxy is located between the client and the device information server. The client accesses the device information server via the Client Proxy, and acquires the device information of the server, as shown in FIG. 5. The Client Proxy may be set inside the client or be set separately.

The Client Proxy may be a Hypertext Transfer Protocol (HTTP) proxy, and is used for a client accessing the device information server. The Client Proxy can initiate an authentication to the client, and the authentication to the client includes Generic Authentication Architecture (GAA) or HTTP Digest Authentication. The Client Proxy forwards a request of the client to the device information server, and forwards a response of the server sent by the device information server to the client. The Client Proxy may use the Transport Layer Security (TLS) to guarantee security of the communication between the client and the Client Proxy. The server can interact with the Client Proxy and the client via the device information server, and can launch a compression function to reduce time for the interaction. The client can send a request for subscribing to a change of the device information to the device information server via the Client Proxy, and receive the response of the device information server via the Client Proxy.

In the embodiment of the present disclosure, the Extensible Markup Language (XML) Configuration Access Protocol (XCAP) can be used between the client and the Client Proxy, between the Client Proxy and the device information server, and between the device information server and the server. The XCAP, which is an HTTP based protocol, can acquire and change information of XML file via commands such as HTTP GET and HTTP PUT. The XML file is used for storing device information. The client or the server accesses the device information stored in the XML file, according to an identifier of the XCAP. The above mentioned accessing process includes: acquiring, updating, and deleting the whole XML file; acquiring, updating and deleting an element of specific device information in the XML file or attributes of the element.

Figure 6:
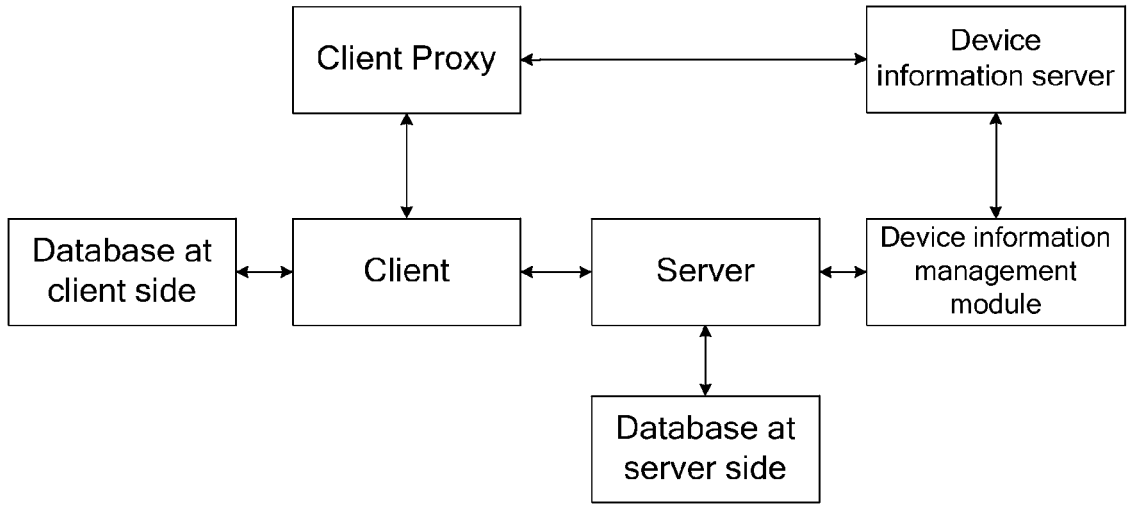
FIG. 6 shows a schematic diagram illustrating another embodiment of system for negotiating device information in a data synchronization process in accordance with the present disclosure.

In some cases, the server can not directly access the device information server. For example, due to security problem, a device information management module may also be set in the network performing the data synchronization in the embodiment of the present disclosure. The device information management module is located between the server and the device information server. The server accesses the device information server via the device information management module, and acquires device information of the client, as shown in FIG. 6; the device information management module may be set in the server set independently.

Figure 7:
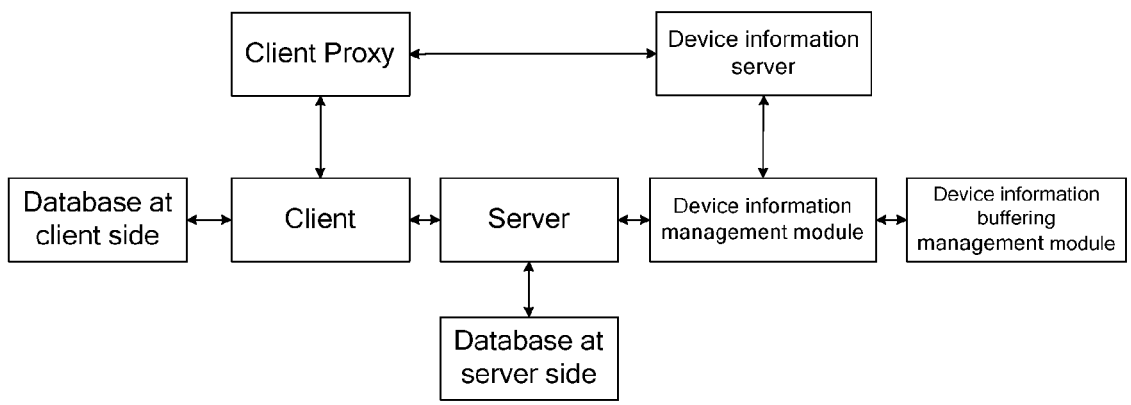
FIG. 7 shows a schematic diagram illustrating a system with a device information buffering management module in accordance with the present disclosure.

The device information of the client, such as information of the static capability of the client, will never be changed after the client is produced. Therefore in the embodiment of the present disclosure, a device information buffering management module for storing device information of the client can be set in the system, after a device capability negotiation between the client and the server is performed for one time. Thus, the server does not need to acquire the device information of the client from the device information server in every subsequent synchronization process. A schematic diagram illustrating the system with a device information buffering management module is shown in FIG. 7. The device information buffering management module is connected to the device information management module, and is used for storing the device information of the client acquired by the device information management module.

If the server can access the device information server, the device information buffering management module is directly connected to the server to perform message interaction.

How the system provided by the embodiment of the present disclosure is used by the client or the server is hereinafter described by taking two specific examples using the system shown in FIG. 5.

In an embodiment of the present disclosure, a client and a server can acquire device information of each other via the system provided by the embodiment of the present disclosure.

Figure 8:
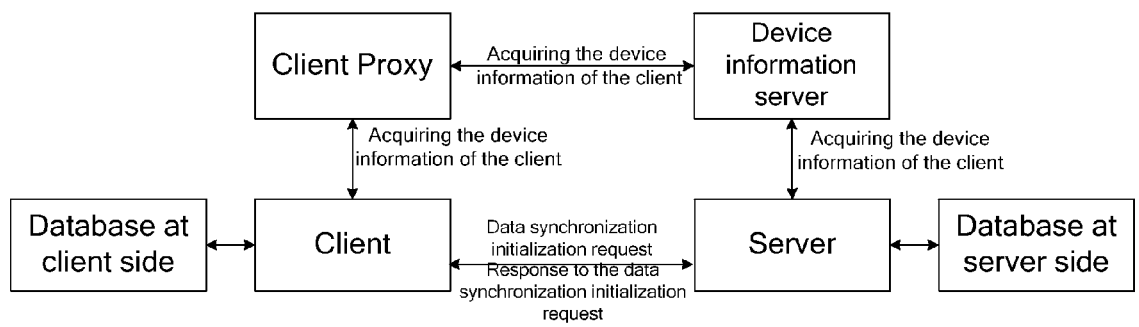
FIG. 8 shows a schematic diagram for a client or a server acquiring device information of an opposing party using the system provided by the present disclosure.

FIG. 8 is a schematic diagram illustrating the client and the server acquire the device information of each other via the system provided by the abovementioned embodiment of the present disclosure. The client sends a data synchronization initialization request carrying a URI corresponding to the device information of the client to the server. The server acquires the device information of the client based on the URI carried in the request from the device information server. The server returns a response to the data synchronization initialization request to the client, and the response carries the URI corresponding to the device information of the server. The client sends a request to the Client Proxy based on the URI carried in the response, and requests to acquire the device information of the server corresponding to the URI. The Client Proxy acquires the device information of the server based on the URI in the device information server, and returns the device information of the server to the client. Thus, a device information negotiation is implemented. The formation of the URI can be "name of communication protocol:// domain name or IP address: port number/path of the device information file", for example, http://www.sample.com/resository/model1.xml. The communication protocol, address and path of the device information file all can be obtained from the URI.

In another embodiment of present disclosure, the client updates the device information stored in the device information server via the system provided by said another embodiment of the present disclosure, when the device information of the client or the server is changed.

Figure 9:
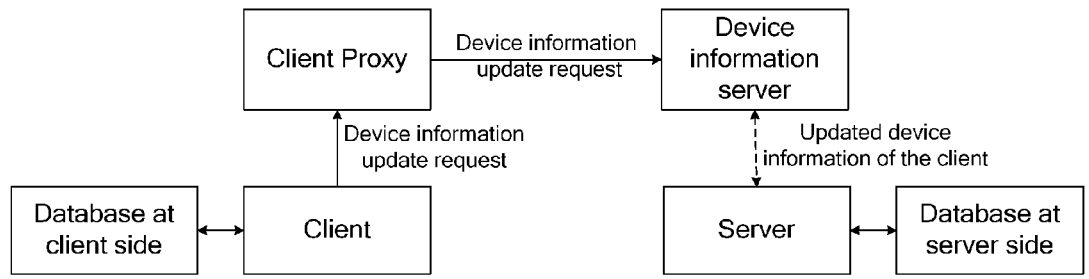
FIG. 9 shows a schematic diagram for a client updating device information of the client stored in the device information server using the system provided by the present disclosure.

FIG. 9 is a schematic diagram illustrating a client updates the device information of the client stored in the device information server via the system provided by said another embodiment of the present disclosure. The device information of the client is changed, and the client sends a device information update request carrying the changed device information of the client to the Client Proxy. The Client Proxy forwards the request to the device information server. The device information server updates the device information of the client stored based on the changed device information of the client carried in the request, and sends the updated device information of the client to the server. The server knows that the device information of the client is updated.

In the embodiment of the present disclosure, the changed device information of the client may not be carried in the device information update request when the device information update request is sent. However, the device information server may directly acquire the changed device information of the client from the client after the device information server receives the request.

The device information update request in the embodiment of the present disclosure may carry one or more types of device information of the client, some elements of one or more types of the device information, specific elements of one or more types of the device information, or/and one or more attributes of the specific elements of one or more types of the device information, when the device information of a client is updated. Thus, only one or more types of device information of the client, some elements of one or more types of the device information, specific elements of one or more types of the device information, or/and one or more attributes of the specific elements of one or more types of the device information are updated, when the device information of the client is updated.

The server may subscribe to a device information change notification. The server can subscribe to the whole file in the device information, some specific elements or the attribute of these elements. The device information server is notified of the changed device information to which the server has subscribed, when the file in the device information is changed. The change information may be carried in the device information change notification sent to the server, if a little of device information is changed. If a great deal of device information is changed, a device information change notification may be sent to the device information server, and the server can directly acquire the changed device information of the client from the device information server.

Figure 12:
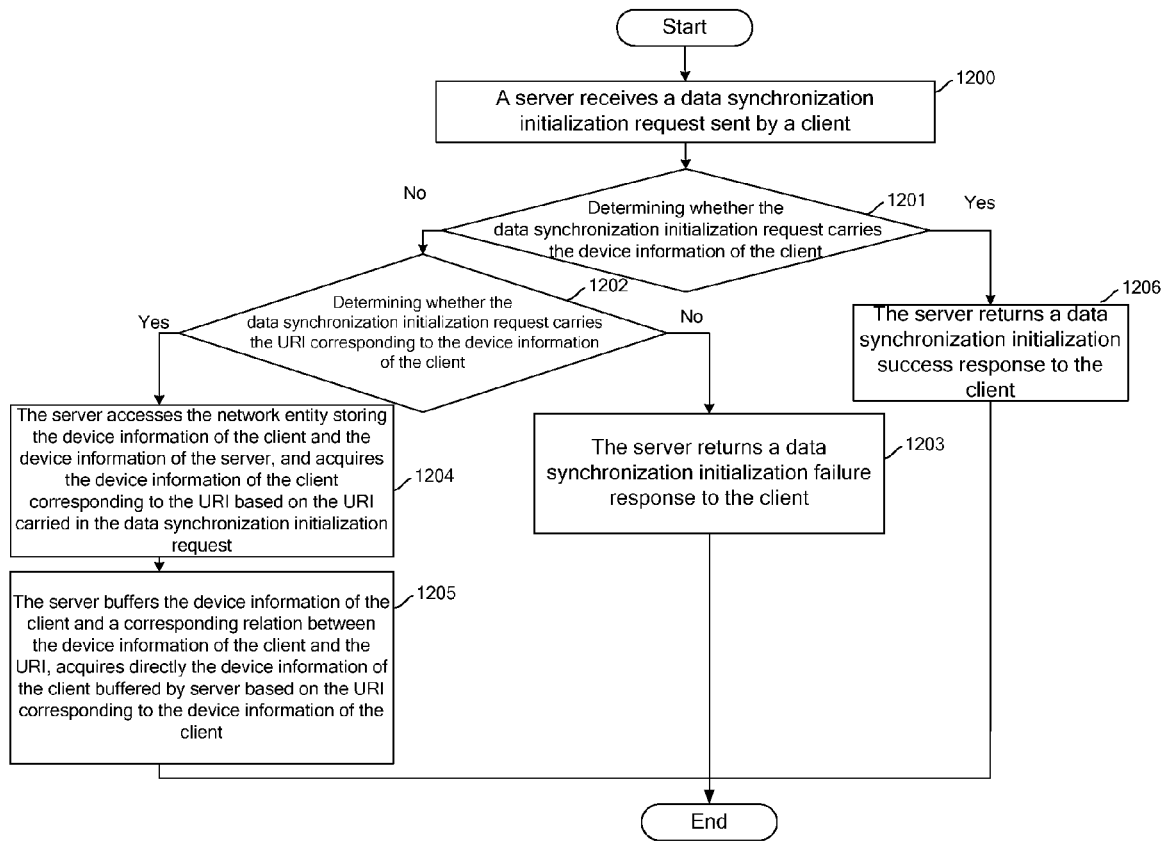
FIG. 12 shows a flow chart of a method for a server acquiring device information of a client when the client initiates a data synchronization initialization process in accordance with the present disclosure.

Likewise, a process similar to the process shown in FIG. 12 may be used to update the device information of the server stored in the device information server, and notify the client when the device information of the server is changed.

Thus, the process of negotiating dynamic device information is implemented.

The embodiment of the present disclosure provides a method for negotiating device information in the data synchronization process, so as to decrease the data transmission flow and save the time of the data synchronization. In the method, the device information of the client and the device information of the server are stored into a network entity in the network performing the data synchronization. A mapping relation between the device information of the client and the server and the identifiers is set. The identifiers may be a URI, basic device information, user account name, or any combinations of the above. The client and the server may acquire the device information of each other based on the identifier from the network entity, and the identifiers correspond to the device information of the client and the server.

Of course, the device information of the client stored includes the device information of multiple clients.

Figure 10:
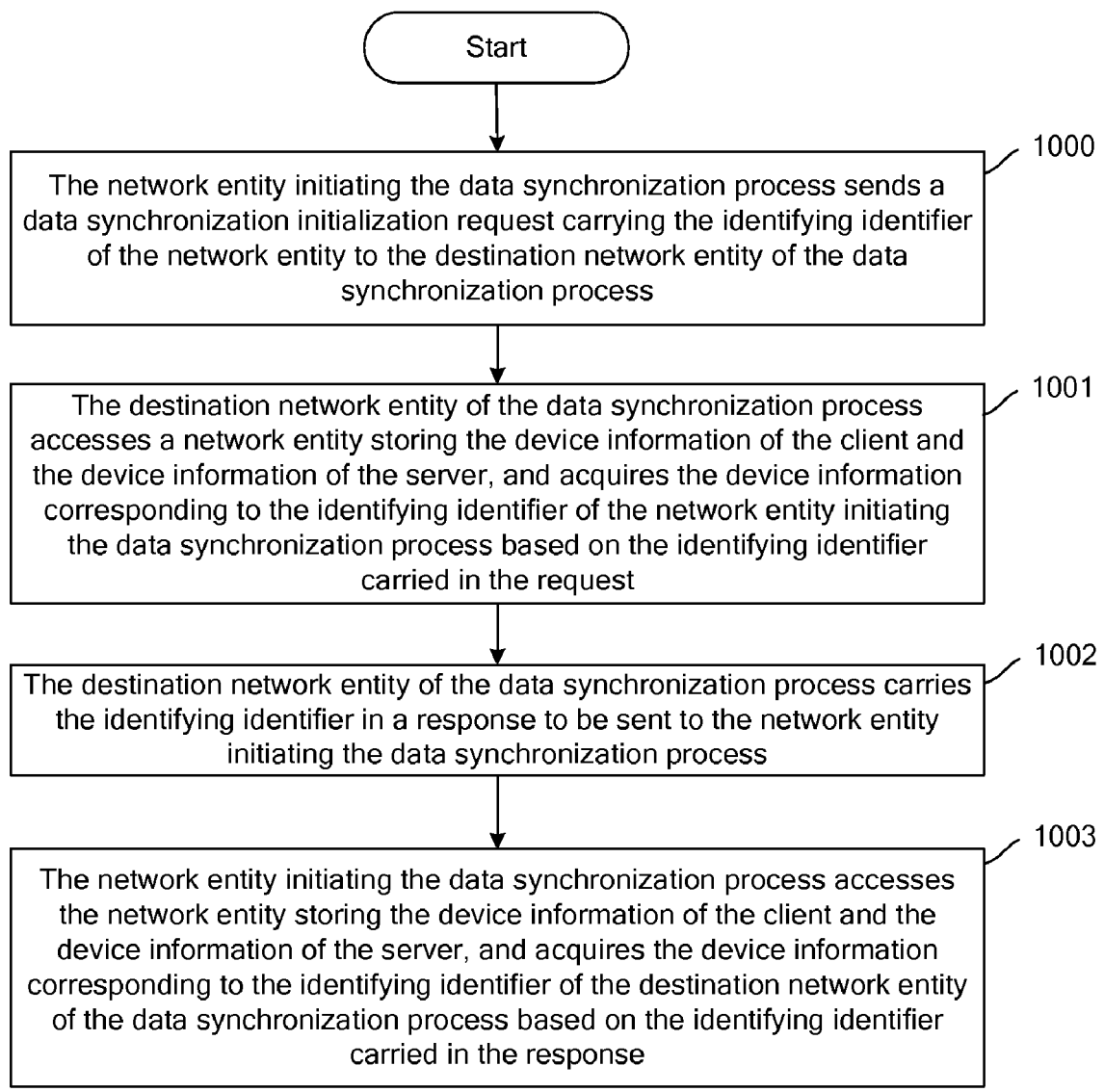
FIG. 10 shows a flow chart of a method for negotiating device information in a data synchronization process in accordance with the present disclosure.

FIG. 10 shows a flow chart illustrating a method for negotiating device information in the data synchronization process in accordance with the embodiment of the present disclosure. Supposing that the client or the server is the network entity initiating a data synchronization process and sending a data synchronization initialization request, and correspondingly the server or the client is the destination network entity of the data synchronization process, receiving the data synchronization initialization request. The detailed processes of the method are described as follows.

In block 1000, a network entity initiating a data synchronization process sends a data synchronization initialization request carrying the identifier of the network entity to a destination network entity of the data synchronization process.

In block 1001, the destination network entity of the data synchronization process accesses a network entity storing device information of a client and device information of a server, and acquires the device information corresponding to the identifier of the network entity initiating the data synchronization process based on the identifier carried in the request.

In block 1002, the destination network entity of the data synchronization process carries the identifier in a response to be sent to the network entity initiating the data synchronization process.

In block 1003, the network entity initiating the data synchronization process accesses the network entity storing the device information of the client and the device information of the server, and acquires the device information corresponding to the identifier of the destination network entity of the data synchronization process based on the identifier carried in the response.

The mapping relation between the device information of the client and the server and the identifiers has one of the following formations: <URI> (the URI itself carries the path of the device information file, as shown in embodiment in the FIG. 5); <URI, path of the device information file>; <type of terminal in the basic device information, path of the device information file>; <type of terminal in the basic device information and software version number, path of the device information file>; <user account name, path of the device information file>, etc.

Thus, the device information negotiation at the data synchronization initialization stage is implemented.

Alternatively, if the network entity initiating the data synchronization process does not need to acquire the device information of the destination network entity of the data synchronization process, the processes in the block 1002 and block 1003 do not need to be performed. When the process in the block 1002 is performed, the device information negotiation is finished.

The schematic diagram illustrating a data structure of the device information in the embodiment of the present disclosure is shown in FIG. 11.

The device information includes basic device information, device capability information, device configuration information, or/and user configuration information.

The basic device information includes manufacturer, terminal model, software version, hardware version or/and terminal category. The device capability information includes synchronization database capability information, communication capability information, synchronization type information, global synchronization feature information or/and dynamic device capability information. The device configuration information includes storage capacity of device or/and limitation to capacity of a certain data type, and other similar information. The user configuration information includes device information configured in advance or/and the configuration in a certain state of the device, and other similar information.

The synchronization database capability information in the device capability information includes: synchronization databases supported such as contacts, Email or/and calendar; version, field, property and value of the property supported by a certain synchronization database, such as contacts vcard 3.0, and the fields, "telephone number" or/and "family address".

The communication capability information in the device capability information includes communication network supported, transfer protocol supported, or/and communication method supported. The network supported may include a general package radio service (GPRS) network and a 3$^{rd}$ generation (3G) communication network. The transfer protocol supported may include the HTTP, Bluetooth, and infrared protocol. The communication method supported may include short message, Wireless Application Protocol (WAP) Push, and Session Initiation Protocol (SIP) Push.

The synchronization type information in the device capability information includes type of synchronization supported, such as two-way synchronization, one-way synchronization, or/and intelligent synchronization.

The global synchronization feature information in the device capability information includes information indicating whether the synchronization of a large object is supported, length of GUID supported, number of stored changes supported, or/and limitation on size of synchronization message supported.

The dynamic device capability information in the device capability information includes information indicating whether synchronization database is disabled or/and information indicating whether the synchronization of a large object is disabled.

The setting of the device information is hereinafter described according to the following embodiment of present disclosure. In the embodiment, the device is in a fly mode, and the device information includes: when synchronizing an Email, synchronizing only contents of Email, but not synchronizing attachments of the Email; disabling function of synchronizing a large object; when performing Bluetooth communication, permitting to synchronize the large object and the attachment of Email. The user configuration information includes: enabling the real time synchronization function during AM 8:00 to PM 6:00, and acquiring the newest Email in real time; disabling the real time synchronization function during PM 6:00-9:00, and forbidding the server to issue a synchronization notification.

A storing format of the device information is shown as follows.

```
<basic device information>
    <manufacturer>Huawei</manufacturer>
    <model>U636</model>
</basic device information>
<device capability information>
    <synchronization database capability information>
        <contacts attribute: whether disabled> version 3.0, supported fields............</contacts>
        <communication capability information>............</communication capability information>
        < supported synchronization type >............</ supported synchronization type >
            <global synchronization feature information>............<global synchronization feature information>
        </device capability information>
        <device storage information>..........<device storage information>
        <device configuration information>.............<device configuration information>
        <user configuration information>.............<user configuration information>
```

The method provided by the embodiment of the present disclosure is hereinafter described by taking the two following specific examples.

FIG. 12 shows a flow chart of a method of a server acquiring device information of a client when the client initiates a data synchronization initialization process in accordance with the embodiment of the present disclosure. The detailed processes of the method are described as follows.

In block 1200, a server receives a data synchronization initialization request sent by a client.

In block 1201, the server determines whether the data synchronization initialization request carries the device information of the client, if yes, proceed to the process in block 1206, and otherwise, proceed to the process in block 1202.

In block 1202, the server determines whether the data synchronization initialization request carries a URI corresponding to the device information of the client, if yes, proceed to the process in block 1204, otherwise, proceed to the process in block 1203.

In block 1203, the server returns a data synchronization initialization failure response to the client, asks the client to initiate the data synchronization initialization process again, and the procedure is terminated.

In block 1204, the server accesses a network entity storing the device information of the client and the device information of the server, and acquires the device information of the client corresponding to the URI based on the URI carried in the data synchronization initialization request.

In block 1205, the server buffers the device information of the client and a corresponding relation between the device information of the client and the URI, acquires directly the device information of the client buffered by the server based on the URI corresponding to the device information of the client when the data synchronization initialization process is performed again, and this procedure is terminated.

In block 1206, the server returns a data synchronization initialization success response to the client, and the procedure is terminated.

Figure 13:
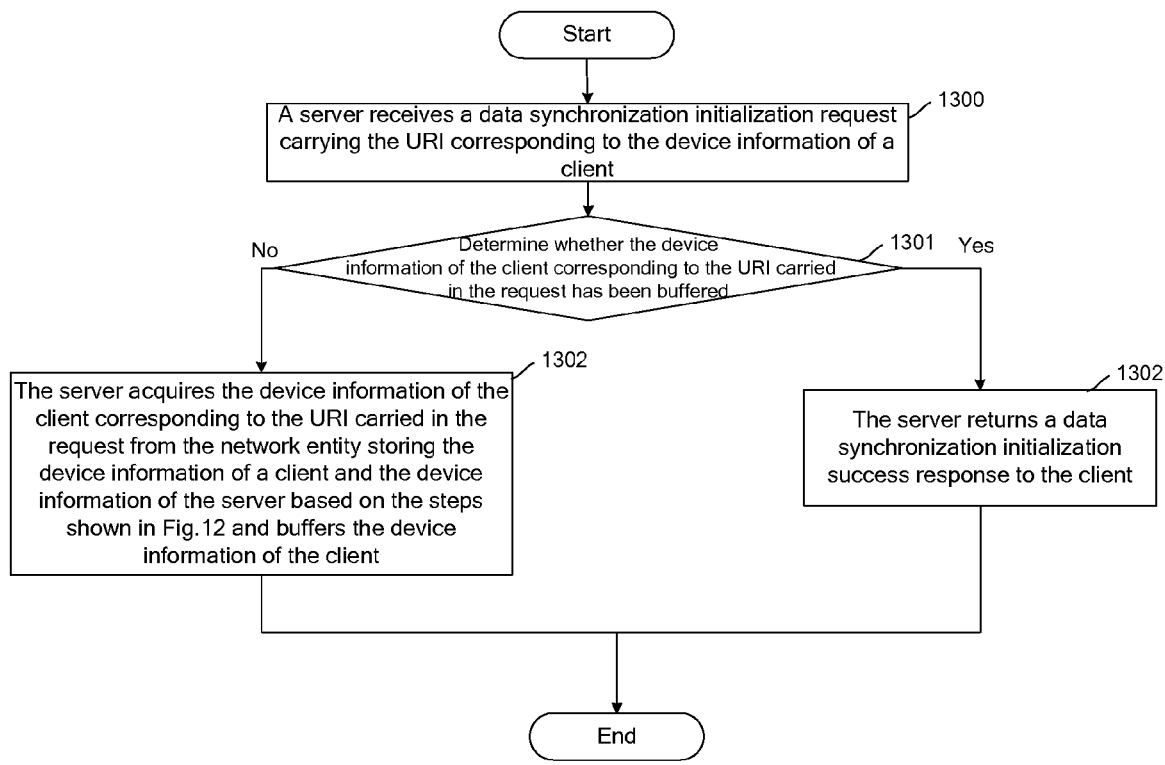
FIG. 13 shows a flow chart of a method for a server acquiring device information of a client when the client initiates a data synchronization initialization process, after a server buffers the device information of the client and a corresponding relation between the device information of the client and a URI, in accordance with the present disclosure.

A flow chart illustrating a method of a server acquiring device information of a client is shown in FIG. 13. In the method, after the server buffers the device information of the client and a corresponding relation between the device information of the client and a URI, the client initiates a data synchronization initialization process.

In block 1300, a server receives a data synchronization initialization request carrying a URI corresponding to device information of a client.

In block 1301, the server determines whether the device information of the client corresponding to the URI has been buffered, based on a corresponding relation between the device information of the client and the URI stored by the server, if yes, proceed to the process in block 1303, and otherwise, proceed to the process in block 1302.

In block 1302, the server acquires the device information of the client corresponding to the URI carried in the request from a network entity based on the processes shown in FIG. 12, and buffers the device information of the client. The above mentioned network entity stores the device information of the client and the device information of the server. Then the procedure is terminated.

In block 1303, the server returns a data synchronization initialization success response to the client, and then the procedure is terminated.

Before the process in block 1303, the server may determine whether device capability of the client has been updated, that is, the server determines whether the device information of the client corresponding to the URI buffered by the server is the same as the device information stored by the network entity storing the device information of the client and the device information of the server, if yes, proceed to perform the process in block 1303, otherwise, proceed to the process in block 1302.

In the embodiment of the present disclosure, the server may subscribe to a device information change notification of the client at the network entity storing the device information of the client and the device information of the server, and support a negotiation of dynamic device information. After the device information of the client in the network entity storing the device information of the client and the device information of the server is changed, the network entity storing the device information of the client and the device information of the server will send a device information change notification of the client to the server based on subscription of the server, and notify the server to update the device information of the client buffered by the server.

Message for a subscription of the device information change notification and the device information change notification may be an SIP message or an HTTP message.

Figure 14:
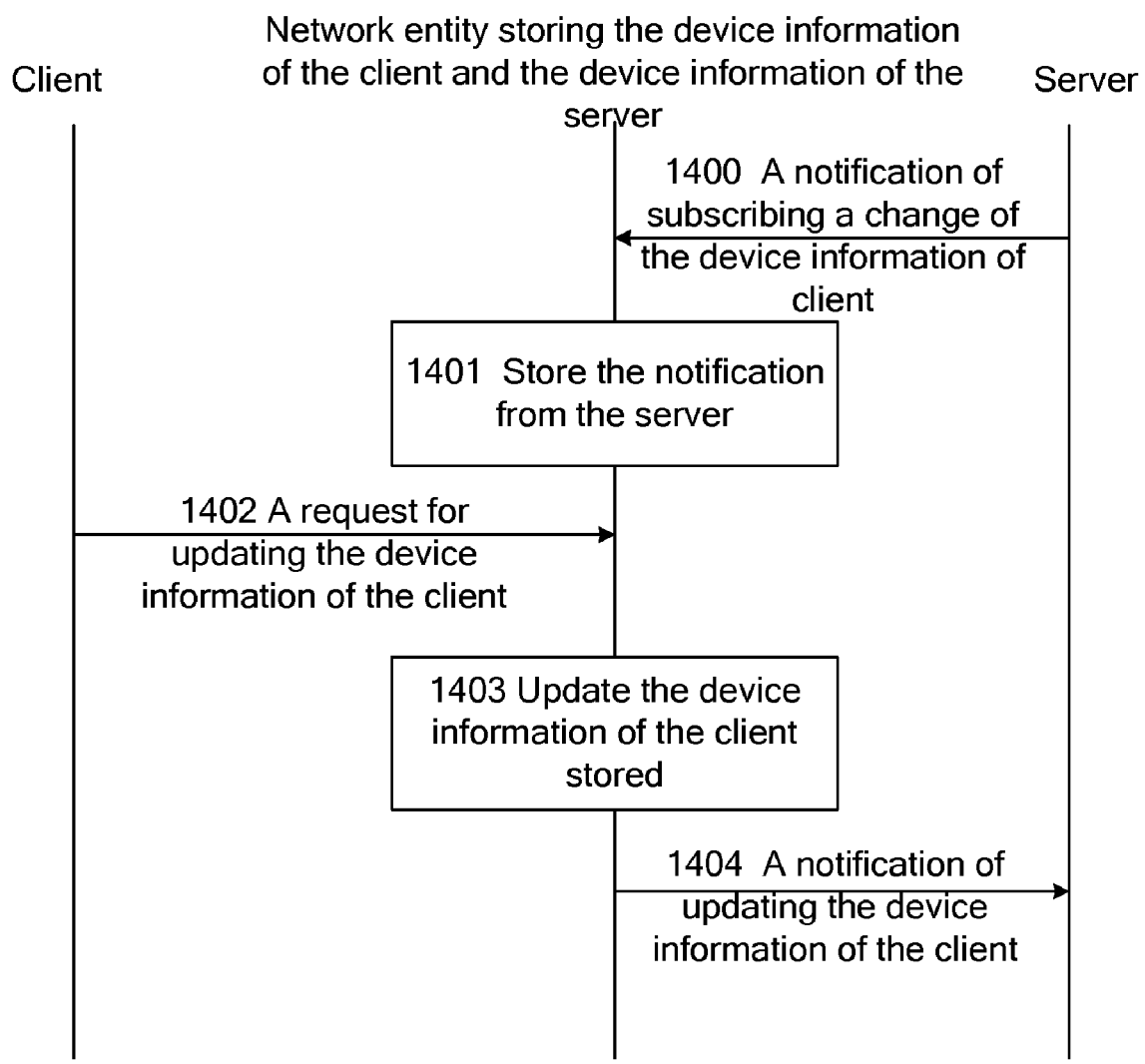
FIG. 14 shows a flow chart of a method for a network entity storing device information of a client and the device information of a server sending a notification for updating the device information of the client to the server, after a server subscribes to a notification of change of the device information of the client, in accordance with the present disclosure.

FIG. 14 is a flow chart of the method for sending, by a network entity storing the device information of the client and the device information of the server, a notification of updating the device information of the client to the server, after a server subscribes to a device information change notification of the client, in accordance with the embodiment of the present disclosure. The detailed processes of the method are described as follows.

In block 1400, a notification of subscribing a change of the device information of client is sent, by a server, to the network entity storing the device information of the client and the device information of the server.

In block 1401, the network entity storing the device information of the client and the device information of the server stores the notification from the server, after receiving the notification.

In block 1402, the client sends a request for updating the device information of the client to the network entity storing the device information of the client and the device information of the server, and the request carries the updated device information of the client.

In block 1403, the device information of the client stored is updated, by the network entity storing the device information of the client and the device information of the server updates, according to the updated device information of the client carried in the request.

In block 1404, a notification of updating the device information of the client is sent, by the network entity storing the device information of the client and the device information of the server, to the server, according to the stored notification of subscribing a change of the device information of client from the server.

Figure 15:
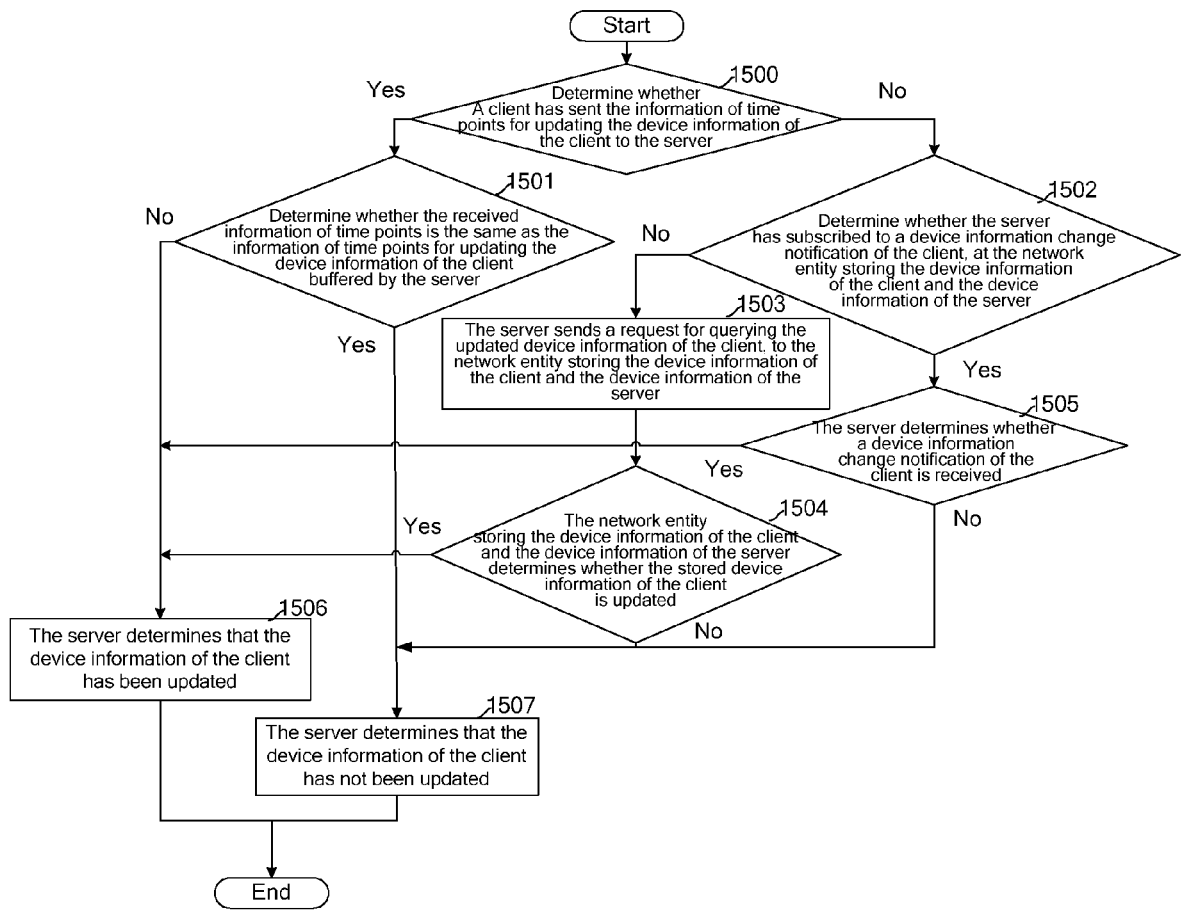
FIG. 15 shows a flow chart of a method for verifying whether device information of a client is changed in accordance with the present disclosure.

In specific implementation, the client may also update the device information of the client periodically, that is, the client updates the device information of the client at set time points. The client may also send the time points for updating the device information of the client to the server; and the server determines, according to the time points, whether the device information of the client buffered by the server is the newest one. As shown in FIG. 15, the detailed processes of the method are described as follows.

In block 1500, a server determines whether a client has sent information of time points for updating device information of the client to the server; if yes, proceed to the process in block 1501, and otherwise, proceed to the process in block 1502.

In block 1501, the server determines whether the received information of time points is the same as the information of time points for updating the device information of the client buffered by the server; if yes, proceed to the process in block 1507, and otherwise, proceed to process in block 1506.

In block 1502, the server determines whether the server has subscribed to a device information change notification of the client, at the network entity storing the device information of the client and the device information of the server; if yes, proceed to the process in block 1505, and otherwise, proceed to the process in block 1503.

In block 1503, the server sends a request for querying the updated device information of the client, to the network entity storing the device information of the client and the device information of the server, and then proceed to the process in block 1504.

In block 1504, the network entity storing the device information of the client and the device information of the server determines whether the stored device information of the client is updated; if yes, a notification of the device information of the client have been updated is sent to the server, and proceed to the process in block 1506, and otherwise, a notification of no change of the device information of the client is sent, by the network entity storing the device information of the client and the device information of the server, to the server, and proceed to the process in block 1507.

In block 1505, the server determines whether a device information change notification of the client is received; if yes, proceed to the process in block 1506, and otherwise, proceed to the process in block 1507.

In block 1506, the server determines that the device information of the client has been updated, and the procedure is terminated.

In block 1507, the server determines that the device information of the client has not been updated, and the procedure is terminated.

In the embodiment of the present disclosure, each item of the stored device information may has attribute, such as an attribute indicating whether the item of device information is disabled, and an attribute indicating whether the item of device information is dynamic. The attribute of the device information may also be changed, when the device information is updated. The device information in accordance with the embodiment of the present disclosure may be described with a markup language.

The device information is hereinafter described according to two specific embodiments.

A first embodiment of the device information of San Zhang:

```
<device information>
    <basic device information>
    <manufacturer> Huawei Technologies Co., LTD
</manufacturer>
        <model>3G-001</model>
        <software version number>2.0</software version number>
        <hardware version number>1.22I</hardware version number>
        <device number>1218182THD000001-2</device number>
        <device category>PDA</device category>
    </basic device information>
```

```
        <device capability information>
        <synchronization database capability information>
        <database 1 whether disabled='No'>
        <address>./contacts</address>
        <display name>Phonebook</display name>
        <maximum length of the GUID>32</maximum length of the
GUID>
        <preferred received data>
        <type>text / vcard of contacts</type>
        <version>3.0</version>
        </preferred received data>
        <preferred sent data>
        <type>text / x-vcard of contacts</type>
        <version>3.0</version>
        </preferred sent data >
        <supported data synchronization capability>
        <type>text / vcard of contacts</type>
        <version>3.0</version>
        <property>
        <property name>BEGIN</property name>
        <property value>VCARD</property value>
        </property>
        </supported data synchronization capability>
        </synchronization database capability information>
        <communication capability information>
        <Bluetooth/>
        <infrared/>
        </communication capability information>
        <supported synchronization type>
        <synchronization type>1</synchronization type>
        <synchronization type>2</synchronization type>
        <synchronization type >7</synchronization type>
        </supported synchronization type>
        <global synchronization feature information>
        <support large object>Yes</support large object>
        <supported maximum number of changes>1000</supported
maximum number of changes>
        </global synchronization feature information>
        </device capability information>
        <device storage information>
        <size of the memory>
        <maximum memory>32650</maximum memory>
        <maximum number of stored data>250</maximum number
of stored data>
        </size of the memory>
        </device storage information>
        <device configuration information>
        <mode 1>
        <mode name>fly mode</mode name>
        <Email synchronization> attachment synchronization
forbidden</Email synchronization>
        <mode 1>
        </mode 1>
        </device configuration information>
        <user configuration information>
        <configuration 1>
        <synchronization period 1>8:00 ~ 18:00</synchronization
period 1>
        <type of synchronization data>Email</type of
synchronization data>
        <synchronization      method>real      time
synchronization</synchronization method>
        </configuration 1>
        <configuration 2>
        <synchronization period 2>18:00 ~ 21:00</synchronization
period 2>
        <type of synchronization data>Email</type of
synchronization data>
        <synchronization      method>real      time
synchronization</synchronization method>
        </configuration 2>
        </user configuration information>
        </device information>
```

Except that the <basic device information> needs to be sent by the client to the server each time when a data synchronization is initialized, other device information of the client may be stored in the network entity storing the device information of the client and the device information of the server, and may be accessed via an identifier.

A second embodiment for the device information relates to the updating of the device information of the client. The second embodiment is described as follows.

At first, a server subscribes to a device information change notification of the client.

Next, the client changes the device information of the client as follows. A: support to a large object is disabled; B: synchronization of contacts is disabled; the client sends an update request to the network entity storing the device information of the client and the device information of the server, to implement the update of the device information of the client. The updated device information of the client carried in the update request includes:

```
        <synchronization feature information>
        <whether a large object is supported attribute: whether
    disabled>
        <synchronization type attribute: whether disabled>
        </synchronization feature information>
        <data storage information disabled>
        <type>x-vCard</type>
        .........
        </data storage information>
        <data storage information enabled>
        <type>short message</type>
        .........
        </data storage information>
        <data storage information   enabled>
        <type>Email</type>
        .........
        </data storage information>
```

Next, a notification of updating the device information of the client is sent, by the network entity storing the device information of the client and the device information of the server, to the server, after the device information of the client stored by the network entity is updated according to the update request.

The server directly buffers the updated device information, if the notification of updating the device information of the client directly carries the updated device information. The server acquires the updated device information of the client from the network entity storing the device information of the client and the device information of the server, and buffers the device information of the client, if the notification of updating the device information of the client does not carries the updated device information.

In the above embodiment, because the support to the large object and synchronization of contacts are disabled, the server does not send a large object, and does not forwardly request the client to initiate a data synchronization of the contacts in the data synchronization process. So an unnecessary negotiation of the device information and a transmission of garbage data can be reduced.

In the embodiment of the present disclosure, the device information may also be denoted as a User Agent Profile. The User Agent Profile is used for describing capability information of a terminal, and includes contents of the following five aspects: a hardware capability including information such as pixels of display screen and size of the display screen; a software capability including information such as information indicating whether downloading is supported, and information indicating the supported types of the software; a network capability including information such as information indicating whether the General Package Radio Service (GPRS) and the Wireless Transport Layer Security (WTLS)

are supported; a browser capability including information such as information indicating whether display of a frame and a table is supported; and a multimedia message capability including information such as a maximum capacity of a multimedia message and a character set. In the embodiment of the present disclosure, the method for acquiring the User Agent Profile may include the Wireless Session Protocol (WSP), the HTTP GET etc.

In order to implement the embodiment of the present disclosure, the User Agent Profile needs to be extended, so that the User Agent Profile extended supports the device information description needed by the data synchronization.

Figure 16:
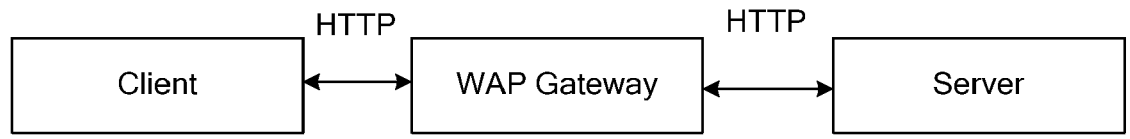
FIG. 16 shows a schematic diagram illustrating a method for a client sending device information to be sent to the server or device information to be updated to the server, in the case that an extended User Agent Profile is used in accordance with the present disclosure.

A schematic diagram illustrating a method of client sending or updating device information via a User Agent Profile extended is shown in FIG. 16.

In FIG. 16, at first, a client sends device information to be sent to the server or device information to be updated, to a WAP gateway through an HTTP request.

Secondly, the WAP gateway forwards the device information to be sent to the server or the device information to be updated, to the server through the HTTP request.

Figure 17:
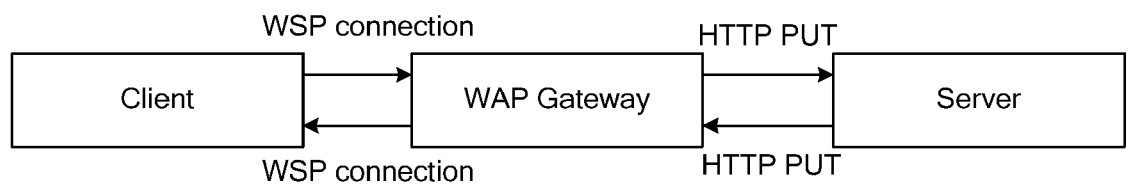
FIG. 17 shows a schematic diagram illustrating another method for a client sending device information to be sent to the server or device information to be updated to the server, in the case that an extended User Agent Profile is used in accordance with the present disclosure.

Another schematic diagram illustrating a method of a client sending or updating device information via a User Agent Profile extended, is shown in FIG. 17, At first, a client establishes a connection to a WAP gateway through a WSP connect (Connect) request, the WAP gateway sends a HTTP PUT request to a server through HTTP PUT, a connection to the server is established.

Secondly, the client sends device information of the client or an update request to the server through a WSP request. The device information of the client is forwarded through the WAP gateway.

A Profile field is contained in a message header of the WSP request, if the device information of the client is to be sent; a Profile-diff field is contained, if an update request is to be sent.

Disadvantages of implementing the embodiment of the present disclosure using the User Agent profile extended are as follows: a subscription cannot be supported, and the client transfers all the changed device information to the server; only the sending the device information of the client to the server is supported, and there is no mechanism for the server sending the device information to the client. Moreover, great changes need to be made to architecture of the User Agent Profile, if the mechanism for the server sending the device information to the client is added.

In the embodiment of the present disclosure, the client and the server are equivalent to each other. A powerful client, such as a PDA and a computer, may also perform a device information negotiation based on the architecture and processing procedure of the server. In the embodiment of the present disclosure, the server with few functions may also perform a device information negotiation process based on the architecture and processing procedure of the client. For example, a buffering mechanism and a compression processing may not be used in the server with few functions.

Figure 18:
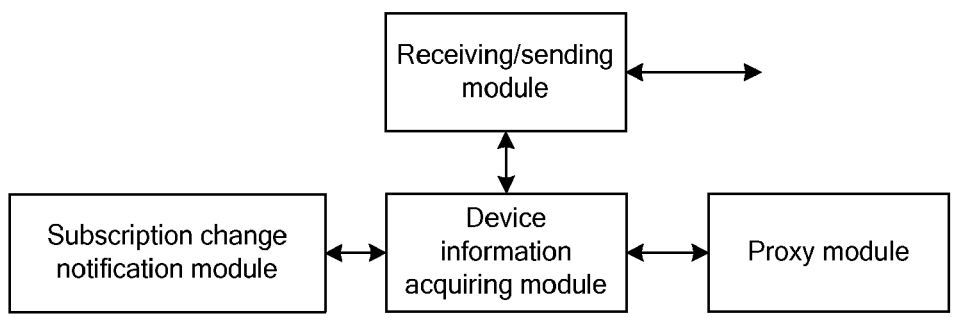
FIG. 18 shows a schematic diagram of a client for negotiating device information in an embodiment of the present disclosure.

An embodiment of the present disclosure also provides a client for negotiating device information. As shown in FIG. 18, the client includes a device information acquiring module and a receiving/sending module.

The device information acquiring module is used for acquiring device information from a device information server, and sending the acquired device information to the receiving/sending module.

The receiving/sending module is used for performing information interaction with device in device information negotiating system based on acquired device information.

The client also includes: a subscription change notification module for generating a subscribed device information change notification and sending the subscribed device information change notification to the device information server via the device information acquiring module; a device information acquiring module for receiving the device information update notification sent by the device information server after device information stored by the device information server is updated.

The client also includes a proxy module via which the device information acquiring module performs message interaction with the device information server.

With the system, method and device provided by the various embodiments of the present disclosure, the device information negotiation process may be simplified, and thus the network flow during the data synchronization is decreased and the time for the data synchronization is saved; the device information buffered in the server and the client may be updated in time after device information is updated dynamically.

Figure 19:
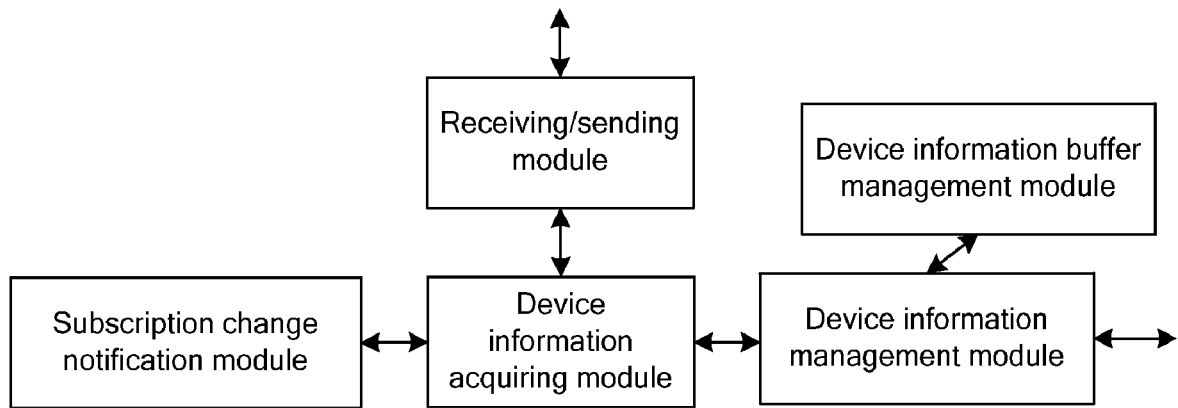
FIG. 19 shows a schematic diagram of a server for negotiating device information in the embodiment of the present disclosure.

An embodiment of the present disclosure also provides a server for negotiating device information. As shown in FIG. 19, the server includes a device information acquiring module and a receiving/sending module.

The device information acquiring module is used for acquiring device information from a device information server storing device information and sending the acquired device information to the receiving/sending module.

The receiving/sending module is used for performing information interaction with a client based on acquired device information.

The server also includes: a subscription change notification module, for generating a subscribed device information change notification, and sending the notification to the device information server via the device information acquiring module; a device information acquiring module, for receiving the device information update notification sent by the device information server after device information stored by the device information server is updated.

The server also includes a device information management module for device information, and the device information acquiring module performs message interaction with the device information server via the device information management module.

The server also includes a device information buffer management module connected to the device information management module, for buffering device information acquired from the receiving/sending module and checking whether the buffer is to be updated.

Figure 20:
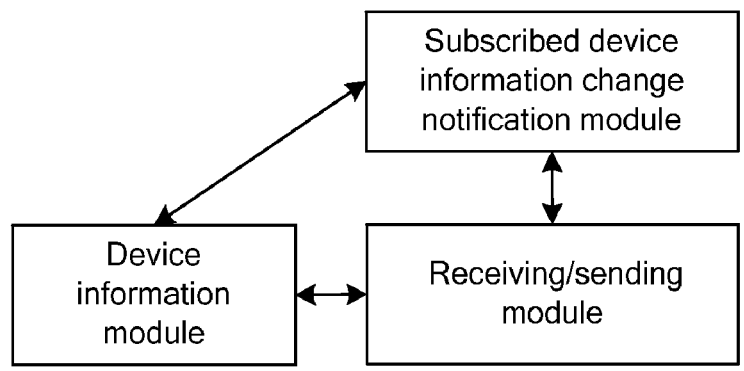
FIG. 20 shows a schematic diagram of a device information server for negotiating device information in the embodiment of the present disclosure.

An embodiment of the present disclosure also provides a device information server for negotiating device information. As shown in FIG. 20, the device information server includes a device information module and a receiving/sending module.

The device information module is used for managing device information of a client and device information of a server, and sending the device information to the receiving/ sending.

The receiving/sending module is used for sending the device information of the client and the device information of the server to the client and the server respectively.

The device information server also includes: a subscribed device information change notification module for generating a device information update notification, and sending the device information update notification to the client or/and server when the device information of the client or/and the server in the device information module is updated, after a client or/and a server subscribes to a device information change notification.

The purpose, technical solution and merits of the present disclosure have been described in detail by various embodiments. It should be appreciated that the foregoing is only specific embodiments of the present disclosure and is not for use in limiting the present disclosure. Any modification, substitution, improvement within the spirit and principle of the present disclosure should be covered in the protection scope of the claims.

What is claimed is:

1. A device information negotiating system, comprising:
a synchronization client device;
a synchronization server device; and
a device information server configured to
store device information of devices and a corresponding relation between the device information and identifiers identifying the device information of the devices, the device information being used for content adaptation during synchronization, and
provide stored device information of a given device, by using the stored corresponding relation, according to a identifier identifying the device information of the given device;
wherein the synchronization client device is further configured to
send a data synchronization initialization request, over a network, carrying a first identifier identifying the device information of the synchronization client device to the synchronization server device to initiate a data synchronization process,
access the device information server with a second identifier identifying the device information of the synchronization server device, the second identifier being carried in a data synchronization initialization response sent by the synchronization server device to the synchronization client device, and
acquire the device information of the synchronization server device, using the second identifier, from the device information server device;
wherein the synchronization server is further configured to
access the device information server with the first identifier,
acquire the device information of the synchronization client device, using the first identifier, from the device information server, and
send the data synchronization initialization response to the synchronization client device;
wherein the device information server is further configured to respectively perform an information interaction with the synchronization client device and the synchronization server device, and respectively provide the requested device information to the synchronization client device and the synchronization server device.

2. The system of claim 1, wherein the device information comprises the device information of the synchronization client device and the device information of the synchronization server device, and there are at least one device information server in the system,
when there are more than one device information server in the system, the device information servers include two device information servers that are configured to respectively store the device information of the synchronization client device and the device information of the synchronization server device; or
the device information servers include two device information servers that each are configured to store the device information of the synchronization client device and the device information of the synchronization server device at the same time based on a set of rules.

3. The system of claim 1, wherein the device information server, configured to update the device information stored in the device information server, according to an update request of the synchronization client device, and send a notification of updating the device information of the synchronization client device to the synchronization server device when the synchronization server device subscribes to a device information change notification of the synchronization client device; or
the device information server, configured to update the device information stored in the device information server, according to an update request of the synchronization server device, and send a notification of updating the device information of the synchronization server device to the synchronization client device when the synchronization client device subscribes to a device information change notification of the synchronization server device.

4. The system of claim 3, wherein the synchronization server device is configured to subscribe to the device information change notification of the synchronization client device by a Session Initiation Protocol (SIP) message or a Hypertext Transfer Protocol (HTTP) message; and
the notification of updating the device information of the synchronization client device or the synchronization server device comprises an SIP message or an HTTP message.

5. The system of claim 1, further comprising:
a Client Proxy located between the synchronization client device and the device information server device, configured to implement a message interaction between the device information server and the synchronization client device.

6. The system of claim 5, wherein the Client Proxy is set separately or integrated into the synchronization client device.

7. The system of claim 5, wherein an interaction message between the synchronization client device and the Client Proxy, an interaction message between the Client Proxy and the device information server, and an interaction message between the device information server and the synchronization server device, are non-compressed messages or compressed messages.

8. The system of claim 7, wherein the non-compressed messages are messages of Extensible Markup Language (XML) and Configuration Access Protocol (XCAP).

9. The system of claim 1, further comprising:
a device information management module located between the device information server and the synchronization server device, configured to implement a message interaction between the device information server and the synchronization server device.

10. The system of claim 9, wherein the device information management module is set separately or integrated into the synchronization server device.

11. The system of claim 9, further comprising:
a device information buffering management module connected to the device information management module, configured to buffer the device information acquired from the device information server, and check whether the buffered device information needs to be updated.

12. The system of claim 11, wherein the device information buffering management module is set separately or integrated into the synchronization server device.

13. The system of claim 1, wherein the device information comprises at least one of the following:
   basic device information, device capability information, device configuration information, and user configuration information.

14. The system of claim 13, wherein the device capability information comprises at least one of the following:
   synchronization database capability information, communication capability information, synchronization type information, global synchronization feature information, and dynamic device capability information.

15. A method for negotiating device information, comprising:
   setting, at a device, a device information network entity for storing device information of devices and a corresponding relation between the device information and identifiers identifying the device information of the devices, the device information being used for a content adaptation during synchronization, the device information network entity being configured to provide stored device information of a given device by using the stored corresponding relation according to a identifier identifying the device information of the given device;
   sending, over a network and by an initiating network entity initiating a data synchronization process, a data synchronization initialization request carrying a first identifier identifying the initiating network entity to a destination network entity of the data synchronization process;
   accessing, by the destination network entity, the device information network entity with the first identifier, and acquiring the device information of the initiating network entity, using the first identifier, from the device information network entity;
   sending, by the destination network entity, a data synchronization initialization response to the initiating network entity;
   wherein the data synchronization initialization response comprises a second identifier identifying the device information of the destination network entity; and
   the method further comprises:
   accessing, by the initiating network entity, the device information network entity with the second identifier; and
   acquiring the device information of the destination network entity, using the second identifier, from the device information network entity.

16. The method of claim 15, further comprising:
   sending, by the initiating network entity or the destination network entity, an update request carrying the updated device information to the device information network entity; and
   updating, by the device information network entity, the stored device information according to the updated device information carried in the update request.

17. The method of claim 16, wherein the device information carried in the update request comprises one or more types of device information, some elements of one or more types of the device information, specific elements of one or more types of the device information, or/and one or more attributes of the specific elements of one or more types of the device information.

18. The method of claim 16, further comprising:
   subscribing, by the initiating network entity or the destination network entity, to a device information change notification at the device information network entity;
   sending, by the device information network entity, a notification of updating the device information to the initiating network entity or the destination network entity, notifying the initiating network entity or the destination network entity to acquire the updated device information.

19. The method of claim 18, wherein a message for a subscription of the device information change notification is a Session Initiation Protocol (SIP) message or a Hypertext Transfer Protocol (HTTP) message; and
   the notification of updating the device information is an SIP message or an HTTP message.

20. The method of claim 18, wherein a subscription of the device information change notification carries one or more types of device information, some elements of one or more types of the device information, specific elements of one or more types of the device information, or/and one or more attributes of the specific elements of one or more types of the device information; and
   the notification of updating the device information carries one or more types of device information, some elements of one or more types of the device information, specific elements of one or more types of the device information, or/and one or more attributes of the specific elements of one or more types of the device information.

21. The method of claim 16, further comprising:
   sending, by the initiating network entity or the destination network entity, a request for querying whether the device information is to be updated to the device information network entity;
   if the device information network entity determines that the stored device information is updated, returning the updated device information, and otherwise, returning a response indicating that the device information is not updated.

22. The method of claim 21, wherein the request for querying whether the device information is to be updated carries one or more types of device information, some elements of one or more types of the device information, specific elements of one or more types of the device information, or/and one or more attributes of the specific elements of one or more types of the device information.

23. The method of claims 15, wherein the network entity initiating the data synchronization process comprises a synchronization client or a synchronization server,
   and the destination network entity of the data synchronization process comprises the synchronization server or the synchronization client.

24. The method of claim 23, further comprising:
   upon acquiring the device information of the synchronization client, buffering, by the synchronization server, the device information of the synchronization client corresponding to an identifier identifying the device information of the synchronization client.

25. The method of claim 24, further comprising:
   sending, by the synchronization client, the data synchronization initialization request carrying the identifier identifying the device information of the synchronization client to the synchronization server;
   acquiring, by the synchronization server, the buffered device information of the synchronization client corresponding to the identifier identifying the synchronization client carried in the data synchronization initialization request.

26. The method of claim 25, further comprising:
determining, by the synchronization server, whether the buffered device information of the synchronization client corresponding to the identifier identifying the device information of the synchronization client is updated;
if no, acquiring, by the synchronization server, the buffered device information of the synchronization client corresponding to the identifier identifying the device information of the synchronization client.

27. The method of claim 26, wherein the determining by the synchronization server whether the buffered device information of the synchronization client corresponding to the identifier identifying the device information of the synchronization client is updated comprises:
determining, by the synchronization server, whether the buffered device information of the synchronization client corresponding to the identifier identifying the device information of the synchronization client is the same as the device information of the synchronization client corresponding to identifiers stored by the network entity for storing the device information;
if no, determining that the buffered device information of the synchronization client corresponding to the identifier identifying the device information of the synchronization client is updated;
if yes, determining that the buffered device information of the synchronization client corresponding to the identifier identifying the device information of the synchronization client is not updated.

28. The method of claim 26, wherein the determining by the synchronization server whether the buffered device information of the synchronization client corresponding to the identifier identifying the device information of the synchronization client is updated comprises:
determining, by the synchronization server, whether a time point when the device information of the synchronization client is buffered is the same as the time point when the device information of the synchronization client is updated sent by the synchronization client;
if no, determining that the buffered device information of the client corresponding to the identifier identifying the device information of the synchronization client is updated;
if yes, determining that the buffered device information of the synchronization client corresponding to the identifier identifying the device information of the synchronization client is not updated.

29. The method of claim 26, wherein the determining by the synchronization server whether the buffered device information of the synchronization client corresponding to the identifier identifying the device information of the synchronization client is updated comprises:
determining, by the synchronization server, whether a device information change notification of the synchronization client subscribed by the synchronization server is received;
if no, determining that the buffered device information of the synchronization client corresponding to the identifier identifying the device information of the synchronization client is updated;
if yes, determining that the buffered device information of the synchronization client corresponding to the identifier identifying the device information of the synchronization client is not updated.

30. The method of claim 15, wherein the first identifier and the second identifier comprises a Uniform Resource Identifier (URI), basic device information, a user account name, or any combinations of the above.

31. The method of claim 15, wherein the device information comprises basic device information, device capability information, device configuration information, or/and user configuration information.

32. The method of claim 31, wherein the device capability information comprises synchronization database capability information, communication capability information, synchronization type information, global synchronization feature information or/and dynamic device capability information.

33. A synchronization client for negotiating device information, comprising:
a data synchronization initialization request sending hardware module, configured to send, over a network, a data synchronization initialization request carrying a first identifier identifying device information of the synchronization client to a synchronization server to initiate a data synchronization process;
a device information acquiring hardware module, configured to acquire device information, using a second identifier identifying device information of the synchronization server carried in a data synchronization initialization response sent by the synchronization server from a device information server, according to the second identifier carried in the response, and send the acquired device information to a receiving/sending module; and
the receiving/sending hardware module, configured to perform information interaction with the synchronization server based on the acquired device information, wherein the device information is used for a content adaptation during synchronization.

34. The synchronization client for negotiating device information of claim 33, further comprising:
a subscription change notification hardware module, configured to generate a subscribed device information change notification, and send the subscribed device information change notification to the device information server via the device information acquiring module;
a device information acquiring hardware module, configured to receive the device information update notification sent by the device information server after device information stored by the device information server is updated.

35. The synchronization client for negotiating device information of claim 33, further comprising:
a proxy hardware module, configured to perform message interaction between the device information acquiring module and the device information server.

36. A synchronization server for negotiating device information, comprising:
a device information acquiring hardware module, configured to
access a device information server storing device information and acquire device information of a synchronization client, from the device information server, with a first identifier identifying device information of the synchronization client, the first identifier being carried in a data synchronization initialization request sent by the synchronization client to the synchronization server, and
send the acquired device information to a receiving/sending module;

the receiving/sending hardware module, configured to perform information interaction with the synchronization client based on the acquired device information;

a response sending hardware module, configured to send a data synchronization initialization response carrying a second identifier identifying device information of the synchronization server to the synchronization client, wherein the device information is used for a content adaptation during synchronization.

37. The synchronization server for negotiating device information of claim 36, further comprising:

a subscription change notification hardware module, configured to generate a subscribed device information change notification, and send the notification to the device information server via the device information acquiring module; and a device information acquiring hardware module, configured to receive the device information update notification sent by the device information server after device information stored by the device information server is updated.

38. The synchronization server for negotiating device information of claim 36, further comprising:

a device information management hardware module, configured to perform message interaction between the device information acquiring module and the device information server; and a device information buffer management hardware module connected to the device information management hardware module, configured to buffer device information acquired from the receiving/sending hardware module and check whether the buffer is to be updated.

39. A device information server for negotiating device information, comprising:

a device information hardware module, configured to manage device information of a synchronization client and device information of a synchronization server and a corresponding relation between the device information and identifiers identifying device information of the synchronization server and the synchronization client, and send the device information to a receiving/sending hardware module;

the receiving/sending hardware module, configured to send the device information of the synchronization client and the device information of the synchronization server to the synchronization client and the synchronization server respectively, wherein the device information is used for content adaptation during synchronization.

40. The device information server for negotiating device information of claim 39, further comprising:

a subscribed device information change notification hardware module, configured to generate a device information update notification, and send the device information update notification to the synchronization client or/and the synchronization server when the device information of the synchronization client or/and the synchronization server in the device information module is updated, after a synchronization client or/and a synchronization server subscribes to a device information change notification.

* * * * *